(12) United States Patent
Ohmori et al.

(10) Patent No.: US 7,174,236 B2
(45) Date of Patent: Feb. 6, 2007

(54) ULTRA-PRECISE PROCESSING METHOD AND APPARATUS FOR INHOMOGENEOUS MATERIAL

(75) Inventors: Hitoshi Ohmori, Wako (JP); Masahiro Anzai, Wako (JP); Kiwamu Kase, Wako (JP); Hideo Tashiro, Wako (JP); Akitake Makinouchi, Wako (JP)

(73) Assignee: Riken, Saitama (JP)

( * ) Notice: Subject to any disclaimer, the term of this patent is extended or adjusted under 35 U.S.C. 154(b) by 233 days.

(21) Appl. No.: 10/486,654

(22) PCT Filed: Aug. 14, 2002

(86) PCT No.: PCT/JP02/08269

§ 371 (c)(1),
(2), (4) Date: Sep. 16, 2004

(87) PCT Pub. No.: WO03/017017

PCT Pub. Date: Feb. 27, 2003

(65) Prior Publication Data

US 2005/0033471 A1    Feb. 10, 2005

(30) Foreign Application Priority Data

Aug. 16, 2001    (JP)    ............................ 2001-246951

(51) Int. Cl.
*G06F 19/00* (2006.01)
(52) U.S. Cl. .................. 700/182; 409/80; 700/197; 702/1; 703/2

(58) Field of Classification Search ................ 700/182, 700/197; 702/1; 703/2; 409/80
See application file for complete search history.

(56) References Cited

U.S. PATENT DOCUMENTS 4,694,404 A    9/1987    Meagher (Continued)

FOREIGN PATENT DOCUMENTS

EP    0 938 949 A1    9/1999

(Continued)

OTHER PUBLICATIONS

K.Kase et al. "Volume Cad", ACM International Conference Proceeding Series; vol. 45, Proceedings of the 2003 Eurographics/IEEE TVCG Workshop on Volume graphics, Tokyo, Japan; SESSION: Systems and applications, pp. 145-150 ; Year of Publication: 2003.*

(Continued)

*Primary Examiner*—Hezron Williams
*Assistant Examiner*—Rodney Frank
(74) *Attorney, Agent, or Firm*—Griffin & Szipl, P.C.

(57) ABSTRACT

(A) V-CAD data of an object (1) is prepared. (B) A processed surface shape after NC processing is predicted by simulation using the V-CAD data. (C) The object is subjected to NC processing by a predetermined NC program, and a processed surface shape after NC processing is measured, and (D) processing correction data is obtained from a difference between the processed surface shapes acquired by simulation and measurement, and the NC program is corrected based on the processing correction data. As a result, the ultra-precise processing is enabled even if a workpiece or a tool has low rigidity and an inconstant quantity of deformation.

10 Claims, 5 Drawing Sheets

U.S. PATENT DOCUMENTS

| | | | |
|---|---|---|---|
| 5,197,013 | A | 3/1993 | Dundorf |
| 5,517,602 | A | 5/1996 | Natarajan |
| 6,075,538 | A | 6/2000 | Shu et al. |
| 6,214,279 | B1 | 4/2001 | Yang et al. |
| 6,471,800 | B2 | 10/2002 | Jang et al. |
| 6,606,528 | B1 | 8/2003 | Hagmeier et al. |
| 6,627,835 | B1 | 9/2003 | Chung |
| 2003/0001836 | A1 | 1/2003 | Ernst et al. |
| 2004/0267400 | A1* | 12/2004 | Ohmori et al. ............. 700/182 |
| 2005/0015173 | A1* | 1/2005 | Ohmori et al. ............. 700/119 |

FOREIGN PATENT DOCUMENTS

| | | |
|---|---|---|
| EP | 1 229 463 A2 | 8/2002 |
| JP | 02-236677 | 9/1990 |
| JP | 03-021432 | 1/1991 |
| JP | 04-075850 | 3/1992 |
| JP | 06-315849 | 11/1994 |
| JP | 07-334541 | 12/1995 |
| JP | 10-063873 | 3/1998 |
| JP | 11-096400 | 4/1999 |
| JP | 2000-340476 | 12/2000 |
| JP | 2001-225393 | 8/2001 |
| JP | 2002-230054 | 8/2002 |

OTHER PUBLICATIONS

International Search Report, completed Nov. 6, 2002, in the Japanese Patent Office and mailed Nov. 19, 2002.

Avila, Ricardo S., et al., "A Haptic Interaction Method for Volume Visualization," Oct. 27, 1996, pp. 197-204.

Ayala, D., et al., "Object Representation by Means of Nonminimal Division Quadtrees and Octrees," ACM Transactions on Graphics, Jan. 1985, pp. 41-59, vol. 4, No. 1.

Kela, Ajay, "Hierarchical octree approximations for boundary representation-based geometric models," Computer-Aided Design, Jul./Aug. 1989, No. 6, London.

Lorenson, William E., et al., "Marching Cubes: A High Resolution 3D Surface Construction Algorithm," Computer Graphics, Jul. 1987, pp. 163-169, vol. 21, No. 4.

Roy, U., et al., "Computation of a geometric model of a machined part from its NC machining programs," Computer-Aided Design, 1999, pp. 401-411, No. 31.

Shute, Gary, "Overview of C Programming," Aug. 23, 1999, http://www.d.umn.edu/~gshute/C/overview.html, last printed Nov. 1, 2004.

Yamaguchi, K. et al, "Computer-Integrated Manufacturing of Surfaces Using Octree Encoding," Jan. 1984, pp. 60-62.

Zesheng, Tang, "Octree Representation and Its Applications in CAD," Journal of Computer Science and Technology, 1992, pp. 29-38, vol. 7, No. 1.

* cited by examiner

ULTRA-PRECISE PROCESSING METHOD AND APPARATUS FOR INHOMOGENEOUS MATERIAL

This is a National Phase Application in the United States of International Patent Application No. PCT/JP02/08269 filed Aug. 14, 2002, which claims priority on Japanese Patent Application No. 246951/2001, filed Aug. 16, 2001. The entire disclosures of the above patent applications are hereby incorporated by reference.

BACKGROUND OF THE INVENTION

1. Technical Field of the Invention

The present invention relates to an ultra-precise processing method and apparatus for an inhomogeneous material, which can perform ultra-precise processing even when a workpiece or a tool has low rigidity and an inconstant deformation quantity.

2. Description of the Related Art

FIG. 1A is a type drawing showing a processing step of a large-diameter lightweight mirror for a large reflecting telescope used in the outer space. This large-diameter lightweight mirror 1 includes a thin reflecting plate 2 (for example, a thickness of 3 to 5 mm) supported by a honey-comb body 3 in order to reduce the weight. Although this large-diameter lightweight mirror has a large-diameter of, e.g., 300 to 700 mm, its weight is restricted to less than 150 kg.

Conventionally, when processing and forming a high-precision and mirror-surface-like high-quality (which will be simply referred to as "ultra-precise" hereinafter) reflecting surface on the surface of the above-described large-diameter lightweight mirror, a processing tool 4 (for example, a cylindrical grinding stone) is moved along a predetermined curve (for example, a parabola) by an NC control while rotating the large-diameter lightweight mirror 1 around its center axis Z, thereby processing a reflecting plate 2.

In FIG. 1A, however, the reflecting plate 2 is just partially supported by the honey-comb body 3, and the rigidity of the reflecting plate 2 at a part not supported by the honey-comb body 3 is low. Therefore, during the grinding process using the processing tool, a contact arc length between the processing tool and the reflecting plate 2 (workpiece) largely varies depending on a processing position, and the processing resistance also greatly fluctuates. Therefore, the deformation of the workpiece itself partially differs, and deformation as indicated by a thin line 2' in FIG. 1B is generated, for example.

As a result, although the processing tool is subjected to precise positional control by the NC control in order to process the workpiece, ultra-precise processing is difficult when the rigidity of the workpiece or the tool is low and its quantity of deformation is inconstant.

SUMMARY OF THE INVENTION

The present invention has been contrived in order to solve the above-described problems. That is, it is an object of the present invention to provide an ultra-precise processing method and apparatus for an inhomogeneous material, which enable ultra-precise processing even when a workpiece or a tool has low rigidity and an inconstant quantity of deformation.

The inventors of the present invention and others invented and filed a "method of storing entity data" by which entity data combining a shape and a physical property can be stored with a small storage capacity (Japanese Patent Application No. 025023/2001, not laid-open).

This method of storing entity data divides external data consisting of boundary data of an object into rectangular parallelepiped internal cells and boundary cells having boundary planes orthogonal to each other in accordance with octree (oct-tree) division, and stores various physical properties in accordance with the respective cells. By this method, a shape, a structure, physical information and history of an object can be managed in an integrated fashion, data concerning a series of processes such as design, processing, assembling, test, evaluation and others can be managed with the same data, and CAD and simulation can be integrated. It is to be noted that the entity data combining the shape and the physical property is referred to as "V-CAD data" hereinafter.

The present invention uses the above-described V-CAD data and performs ultra-precise processing of an inhomogeneous material by utilizing both simulation and measurement. That is, according to the preset invention, there is provided an ultra-precise processing method for an inhomogeneous material, comprising the steps of: (A) preparing V-CAD data obtained by dividing external data consisting of boundary data of an object (1) into rectangular parallelepiped cells (13) having boundary planes orthogonal to each other in accordance with octree division, and separating the respective divided cells into internal cells (13a) positioned on the inner side of the object and boundary cells (13b) including a boundary face; and (B) generating an NC ("Numerical Control") program by using the V-CAD data and subjecting the object to NC processing by the NC program.

According to a preferred embodiment of the present invention, (C) a processed surface shape of the object after NC processing is predicted by simulation using the V-CAD data, (D) the processed surface shape of the object after NC processing is measured, and (E) processing correction data is obtained from a difference between processed surface shapes acquired by the simulation and the measurement, and the NC program is corrected based on the processing correction data.

Further, according to the present invention, there is provided an ultra-precise processing apparatus for an inhomogeneous material comprising: a storage device (24) which stores V-CAD data (14) obtained by dividing external data consisting of boundary data of an object (1) into rectangular parallelepiped cells (13) having boundary planes orthogonal to each other in accordance with octree division, and separating the respective divided cells into internal cells (13a) positioned on the inner side of the object and boundary cells (13b) including a boundary face, the storage device further storing a simulation program (20) used to predict a processed surface shape after NC processing by simulation using the V-CAD data, and a data correction program (22) which corrects the NC program; an NC processing device (26) which subjects the object to NC processing by using a predetermined NC program; and a measurement device (28) which measures the processed surface shape of the object on the NC processing device after NC processing, wherein processing correction data is obtained from a difference between processed surface shapes acquired by the simulation and the measurement and the NC program is corrected based on the processing correction data.

According to the method and apparatus of the present invention mentioned above, since the V-CAD data is stored, which is obtained by dividing the external data of the object (1) into rectangular parallelepiped cells (13) having boundary planes orthogonal to each other in accordance with octree division, and separating the respective divided cells into the internal cells (13a) positioned on the inner side of the object and the boundary cells (13b) including the boundary face, the external data can be stored by using a small storage capacity as a hierarchy of the cells.

Further, since the processed surface shape after NC processing is predicted by simulation by using the V-CAD data, accurate simulation can be performed taking physical properties of respective portions into consideration even if the object is an inhomogeneous material and has low rigidity and an inconstant quantity of deformation.

Furthermore, the object is actually subjected to NC processing by a predetermined NC program, the processed surface shape after this processing is measured, the processing correction data is obtained from a difference between the processed surface shapes acquired by the simulation and the measurement, and the NC program is corrected based on the processing correction data. Therefore, the processing characteristics which cannot be predicted by the simulation can be also taken into consideration for the next NC program.

Thus, even if the rigidity of a tool or the like other than a workpiece is low or there is an error factor in the processing system itself, their influence can be avoided and ultra-precise processing is enabled.

According to a preferred embodiment of the present invention, in the simulation, a stress when attaching the object, a load and a quantity of deformation due to heat generation/vibrations during processing, roughness, a transmittance, and quantities of deformation of a processing tool and a processing system are simulated, and prediction data of a quantity of deformation, roughness and a transmittance of each portion of the object is thereby generated. Furthermore, the simulation is carried out by using a finite element method by mesh generation based on the V-CAD data of the object. Moreover, the simulation is carried out by using the finite element method through modeling and mesh generation of the processing tool and the processing system.

By these methods, the prediction accuracy by simulation can be increased.

In addition, in the measurement, measurement data of a shape, a dimension error, roughness and a transmittance at each part of the object after NC processing is generated. Additionally, in the measurement, there are carried out surface measurement using a contact type probe with a low contact pressure, a laser, a non-contact type probe using the atomic force and/or optical measurement of a transmittance.

The accuracy of the measurement can be increased by using these measurement means.

Additionally, the NC processing includes cutting processing, grinding processing or a composite process thereof. Further, the grinding processing uses electrolytic dressing utilizing a metal bonded grinding stone.

The high-precision and high-quality ultra-precise processing is enabled by using the above-described processing means.

Other objects and advantageous features of the present invention will be apparent from the following description in conjunction with the accompanying drawings.

BEST MODE FOR CARRYING OUT OF THE INVENTION

A preferred embodiment according to the present invention will now be described hereinafter with reference to the accompanying drawings.

Figure 2:
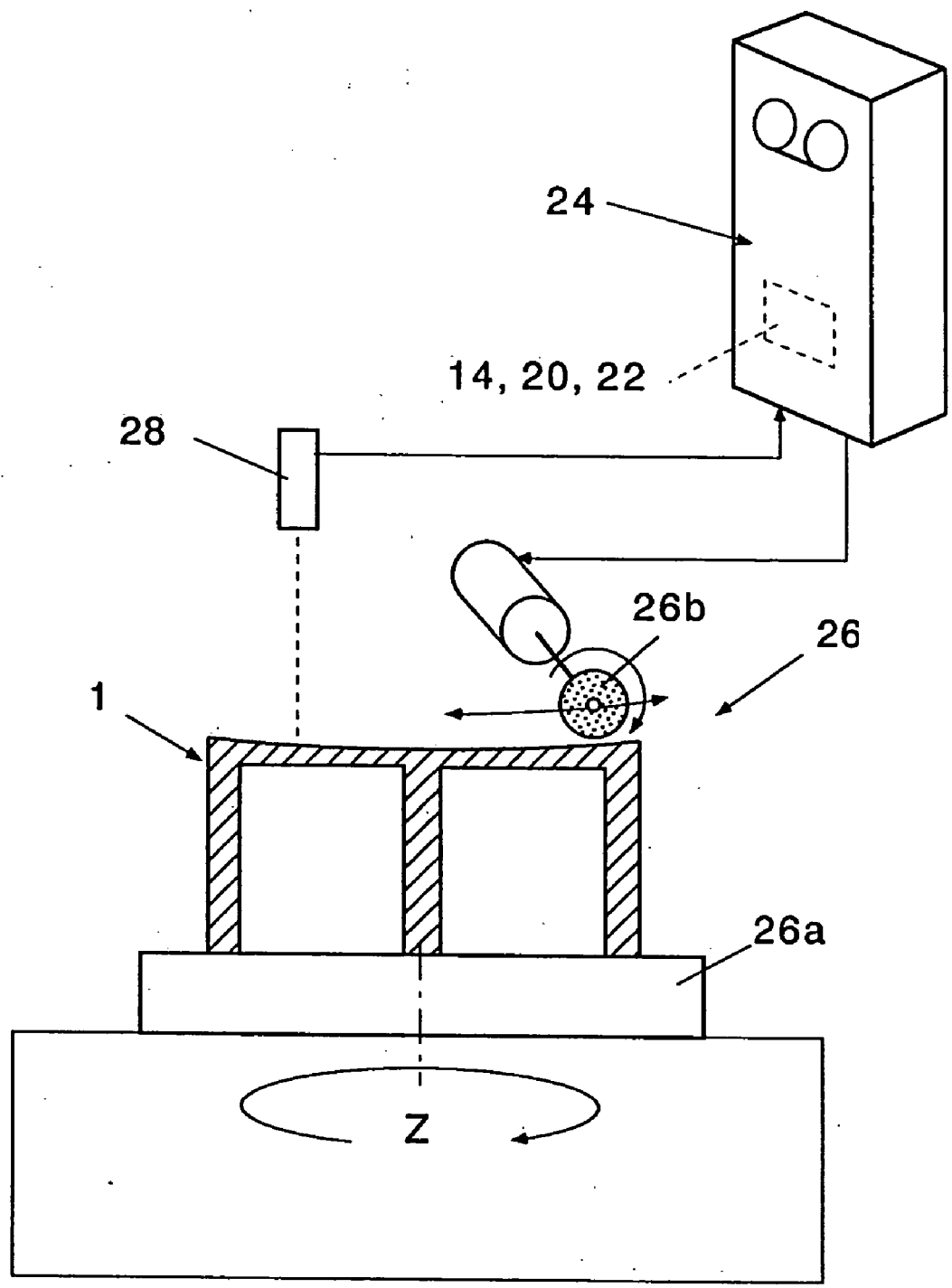
FIG. 2 is an entire structural view of an ultra-precise processing apparatus according to the present invention.

FIG. 2 is an entire structural view of an ultra-precise processing apparatus according to the present invention. As shown in the drawing, the ultra-precise processing apparatus according to the present invention includes a storage device 24 which stores V-CAD data 14, a simulation program 20 and data correction program 22, an NC processing device 26, and a measurement device 28.

Figure 1A:
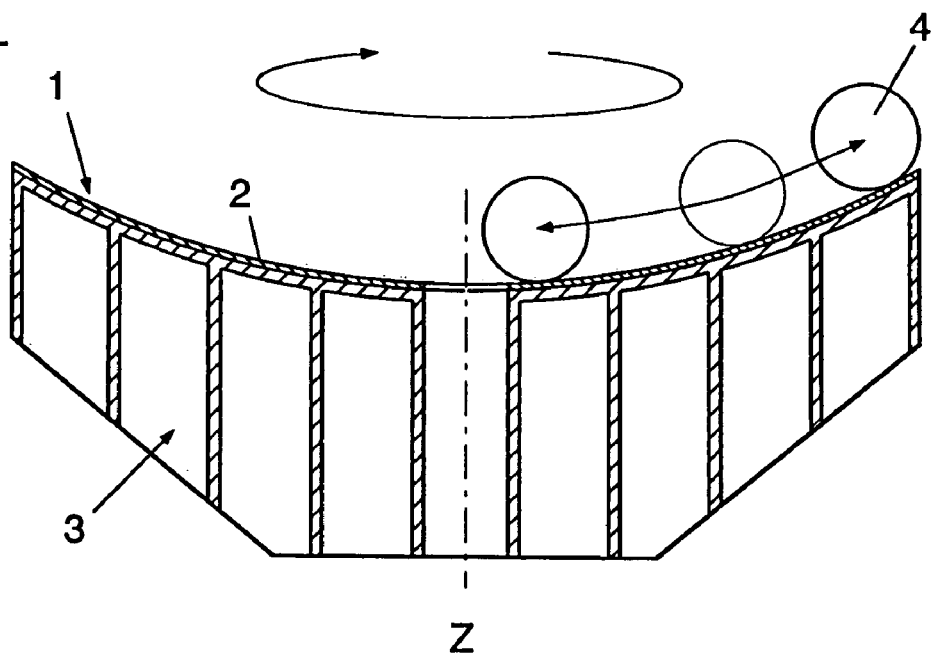
FIGS. 1A and 1B are type drawings of conventional ultra-precise processing means.
Figure 1B:
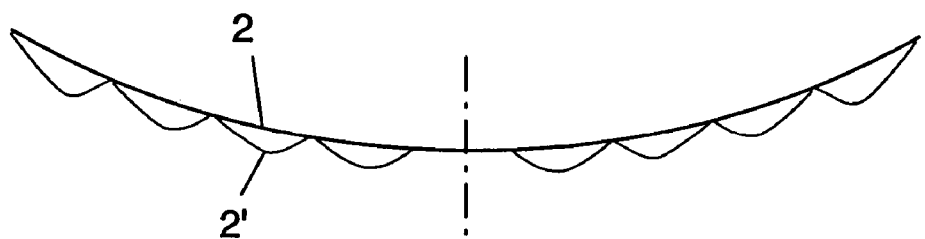

A workpiece (object 1) may be a large-diameter lightweight mirror shown in FIGS. 1A and 1B or any other inhomogeneous material having low rigidity and an inconstant quantity of deformation. Furthermore, the present invention is not restricted to such a material, and it can be likewise applied to a homogeneous material having high rigidity.

In this example, the NC processing device 26 includes a rotary table 26a which rotates and drives a processed object, i.e., a workpiece (object 1) around its vertical center axis Z. The NC processing device 26 includes a processing tool 26b used to process the workpiece 1. The cylindrical processing tool 26b is moved along a predetermined curve (for example, a parabola) by the NC control while rotating the workpiece 1 around its center axis Z to process the surface of the workpiece 1 by the processing tool 26b. The processing tool 26b has, e.g., a cylindrical shape, a spherical shape or a planar shape.

In the present invention, the NC processing is not restricted to grinding processing using a grinding stone, and it may be cutting processing, polishing processing or a composite process combining such processing. Moreover, in the case of the grinding processing, the high-precision and high-quality ultra-precise processing can be highly efficiently performed by using the electrolytic dressing utilizing a metal bonded grinding stone.

The measurement device 28 is, e.g., a laser type non-contact probe and measures the processed surface shape of the workpiece 1 on the NC processing device 26 after NC processing. It is to be noted that the present invention is not restricted to the laser type, and a contact type probe with a low contact pressure or a non-contact type probe using the atomic force may be used or measurement of a transmittance may be optically performed. Moreover, in addition to the measurement of the processed surface shape, it is desirable to also measure a shape dimension error or shape roughness in each portion of the object after NC processing, a transmittance of an optical element and others.

The V-CAD data 14 is obtained by dividing external data consisting of boundary data of the object 1 into rectangular parallelepiped cells 13 having boundary plans orthogonal to each other in accordance with octree division, and separating the respective divided cells into internal cells 13a positioned on the inner side of the object and boundary cells 13b including a boundary face.

In addition, the simulation program 20 is designed to predict a processed surface shape after NC processing by simulation using the V-CAD data 14.

Additionally, the data correction program 22 is designed to obtain processing correction data from a difference between the processed surface shapes acquired (predicted) by simulation and the processed surface shape acquired by the measurement, and correct the NC program based on the processing correction data.

Figure 3:
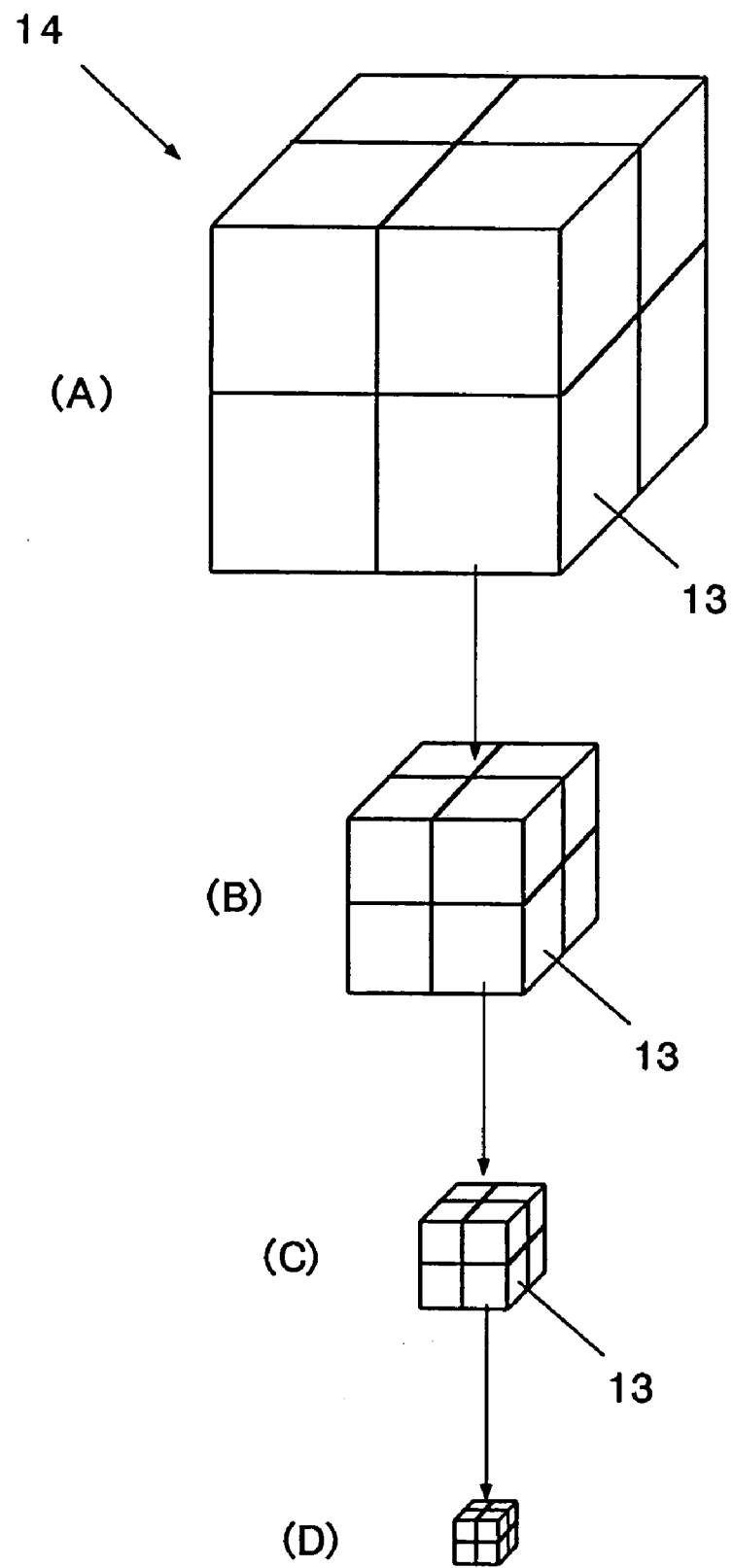
FIG. 3 is an explanatory view of a data structure in ultra-precise processing according to the present invention.

FIG. 3 is an explanatory view of a data structure in an ultra-precise processing according to the present invention. In the V-CAD data 14, the modified octree space division is performed. The octree expression, namely, the space division based on octree divides a standard rectangular solid 13 which includes a target solid (object) into eight parts as shown in (A) of the drawing, and recursively repeats the eight-part division processing until the solid is completely included in or excluded from each area as shown in (B), (C) and (D) of the drawing. By this octree division, a quantity of data can be greatly reduced as compared with the voxel expression.

One space area divided by the space division based on octree is referred to as a cell 13. The cell is a rectangular parallelepiped having boundary planes orthogonal to each other. The areas occupying in the space are represented by a hierarchical structure based on the cells, the division number or a resolution. As a result, the object in the entire space is represented as superimposition of the cells having the different sizes.

That is, in the method according to the present invention, the boundary and the inside physical property are converted into the following entity data 14 (V-CAD data) from the external data. The boundary data approximates exactly (for example, in case of a flat plane, it can be exactly reconfigured at three points included therein) or in a specified limit deviation tolerance (a position, a tangent line, a normal line and a curvature, and threshold values specified for the connectivity of them with the neighboring areas).

A special case of an interpolation curve is a Marching Cube. In the present invention, subdivision is necessarily performed until expression at cut points on an edge line becomes possible and until the normal line or a main curvature and the continuity are satisfied. Furthermore, the surface of the second (quadratic) or lower order is exactly expressed, and a free-form surface is approximated by the surface in the cell based on the flat surface or the surface of the second order, thereby saving only a geometric inherent quantity.

Figure 4:
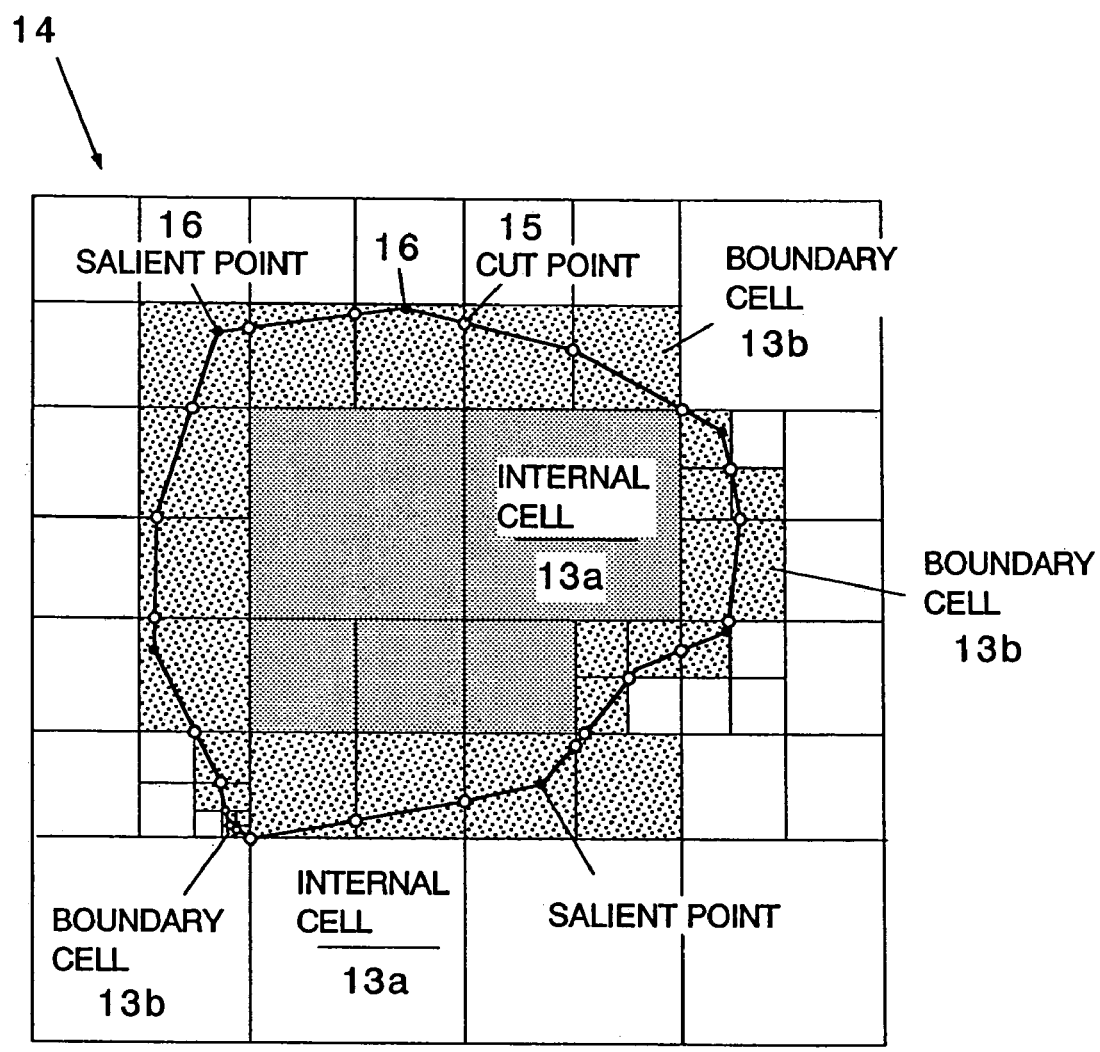
FIG. 4 is a type drawing two-dimensionally showing a division method according to the present invention.

FIG. 4 is a type drawing two-dimensionally showing the division method according to the present invention. In the present invention, the respective divided cells 13 are separated into internal cells 13a positioned on the inner side of the object and boundary cells 13b including a boundary face.

That is, in the present invention, the modified octree is used in order to express the boundary cell 13b, cells which are completely included inside are constituted by the internal cells 13a (rectangular parallelepiped) having the maximum size, and cells including boundary information from the external data are constituted as the boundary cells 13b. Each boundary cell 13b is exactly or approximately replaced with cut points 15 (indicated by the white circle in the drawing) on 12 edge lines in the three-dimensional expression or four edge lines in the two-dimensional expression.

The boundary cell 13b is subjected to octree division until the sufficient cut points 15 can be obtained, with which boundary shape elements constituting the boundaries included in the external data can be reconfigured (exactly with respect to analytic surfaces such as a flat surface or a quadric surface, and approximately with respect to boundary shape elements which can be expressed by a free-form surface or a discrete point group).

For example, the space is hierarchically divided into eight parts until two points on one line segment become cut points 15 on the edge line of the cell in case of one line segment, until three points become the cut points in case of a flat surface, until three points become cut points in case of a quadratic curve, until four points become cut points in case of a quadratic surface, and until necessary and sufficient points and edge lines of the cell can be found in a defined range in cases where the expression of the external data is known with respect to each of a polynomial surface and a rational expression surface.

That is, division is carried out until a position to be subjected to subdivision satisfies a specified resolution at a boundary (surface) part or until a rate of change of a value of an analysis result (a stress, a distortion, a pressure, a flow velocity or the like) becomes equal to or lower than a specified threshold value.

Further, as to salient points 16 (indicated by black circles in the drawing) of the cell 13b including a plurality of the boundary shape elements, the boundary therein can be indirectly expressed as an intersecting line of the boundary expressed by the cut point 15 held by an adjacent boundary cell (which has the cut points sufficient for reconfiguration and is divided until the boundary elements completely come across), and hence subdivision is not carried out more than needs.

Therefore, the V-CAD data 14 becomes, as information concerning the shapes stored inside the cell, an index indicating a position of the cell, the division number or a resolution indicating a degree of detail in the hierarchy, a pointer indicating an adjacent cell, the number of cut points, and coordinate values of cut points. Further, depending on use application, the V-CAD data 14 can become a normal line, a curvature, or the like.

Furthermore, as the V-CAD, node information or values of the result are held in the form of Euler in the lowermost layer. How to determine a threshold value (limit deviation tolerance) concerning the continuity of each of a position of the boundary, a normal line, a tangent line and the curvature is defined in such a manner that the minimum resolution in subdivision becomes as large as possible.

Figure 5:
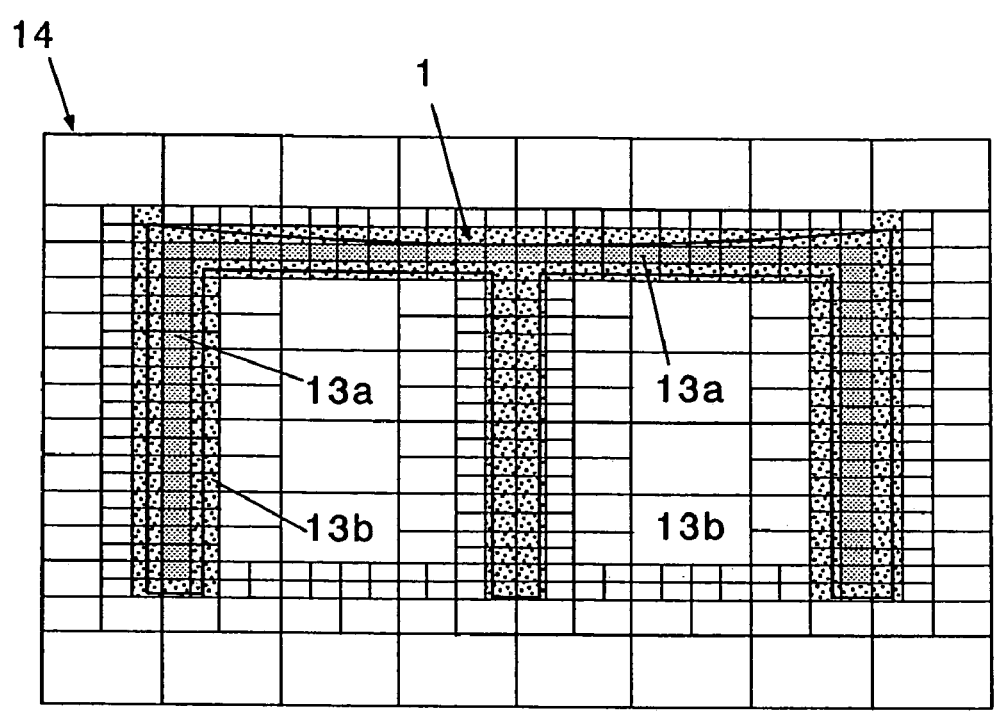
FIG. 5 is a type drawing showing a workpiece 1 (object) in the form of V-CAD data.

FIG. 5 is a type drawing showing the workpiece 1 (object) in the form of the V-CAD data. In the method according to the present invention, with the apparatus shown in FIG. 2, the V-CAD data of the workpiece 1 is first prepared. That is, as shown in FIG. 5, the workpiece 1 is separated into the internal cells 13a and the boundary cells 13b in the V-CAD data. In the case of this V-CAD data 14, design data, measurement data acquired by a digitizer or voxel data is converted and used, and new V-CAD data is reconfigured every time simulation or measurement is carried out.

In the method according to the present invention, the V-CAD data 14 is then used and a processed surface shape after NC processing is predicted by simulation. In addition, in parallel with or alternately with this operation, the object 1 is subjected to NC processing by a predetermined NC program, and a processed surface shape after NC processing is measured.

Then, processing correction data is obtained from a difference between the processed surface shape acquired by the simulation and the processed surface shape acquired by the measurement, and the NC program is corrected based on the processing correction data.

In simulation, it is desirable to simulate a stress when attaching the object, a load and a quantity of deformation due to heat generation/vibrations during processing, roughness, a transmittance and a quantity of deformation of a processing tool and a processing system, and thereby generate prediction data or the like of a quantity of deformation, roughness and a transmittance in each portion of the object.

In addition, in order to improve the prediction accuracy by simulation, it is preferable that simulation is carried out by mesh generation based on the V-CAD data of the object, by a finite element method, and modeling and mesh generation of the processing tool and the processing system in simulation are also performed by using the finite element method.

Additionally, in order to enhance the accuracy of the measurement, it is desirable to generate measurement data of a shape, a dimension error, roughness and a transmittance in each portion of the object after NC processing.

According to the method and the apparatus of the present invention mentioned above, since the V-CAD data 14 is stored, which is obtained by dividing the external data of the object 1 into rectangular parallelepiped cells 13 having boundary planes orthogonal to each other in accordance with the octree division, and separating the respective divided cells into the internal cells 13*a* positioned on the inner side of the object and the boundary cells 13*b* including the boundary face, the external data can be stored with a small storage capacity as a hierarchy of the cells.

Further, since using this V-CAD data 14, the processed surface shape after NC processing is predicted by simulation, the accurate simulation can be performed by taking a physical property of each portion into consideration even if the object is an inhomogeneous material and has the low rigidity and an inconstant quantity of deformation.

Furthermore, the object is actually subjected to NC processing by using a predetermined NC program, a processed surface shape of the object on the NC processing device after processing is measured, processing correction data is obtained from a difference between the processed surface shape acquired by the simulation and the processed surface shape acquired by the measurement, and the NC program is corrected based on the processing correction data. Therefore, errors of simulation itself or the processing characteristics which cannot be predicted by simulation can be modified and taken into consideration for the next NC program.

Therefore, even if a tool or the like other than the workpiece has the low rigidity or the processing system itself has an error factor, their influence can be avoided, and the ultra-precise processing is enabled.

As described above, the ultra-precise processing method and apparatus for an inhomogeneous material according to the present invention have the excellent advantages, for example, enabling the ultra-precise processing even if the workpiece or the tool has the low rigidity and an inconstant quantity of deformation.

It is to be noted that the present invention has been described with reference to the several preferred embodiments but it can be understood that scope of the claims included in the present invention is not restricted to these embodiments. On the contrary, the scope of the claims of the present invention includes all improvements, modifications and equivalents included in the appended claims.

The invention claimed is:

1. An ultra-precise processing method for an inhomogeneous material, comprising the steps of:
    (A) preparing V-CAD data obtained by dividing external data consisting of boundary data of an object into rectangular parallelepiped cells having boundary planes orthogonal to each other in accordance with octree division, and separating the respective divided cells into internal cells positioned on the inner side of the object and boundary cells including a boundary face; and
    (B) generating a Numerical Control program by using the V-CAD data and subjecting the object to Numerical Control processing by using the Numerical Control program.

2. The ultra-precise processing method for an inhomogeneous material according to claim 1, further comprising:
    (C) predicting a processed surface shape of the object after Numerical Control processing by simulation using the V-CAD data;
    (D) measuring a processed surface shape of the object after Numerical Control processing; and
    (E) obtaining processing correction data from a difference between the processed surface shapes acquired by the simulation and the measurement, and correcting the Numerical Control program based on the processing correction data.

3. The ultra-precise processing method for an inhomogeneous material according to claim 2, wherein a stress at the time of attaching the object, a load and a quantity of deformation due to heat generation/vibrations during processing, roughness, a transmittance, and quantities of deformation of a processing tool and a processing system are simulated in the simulation, and prediction data of a quantity of deformation, roughness and a transmittance in each portion of the object is thereby generated.

4. The ultra-precise processing method for an inhomogeneous material according to claim 2, wherein the simulation is carried out by mesh generation based on the V-CAD data of the object by using a finite element method.

5. The ultra-precise processing method for an inhomogeneous material according to claim 2, wherein the simulation is carried out by a finite element method through modeling and mesh generation of the processing tool and the processing system.

6. The ultra-precise processing method for an inhomogeneous material according to claim 2, wherein measurement data of a shape, a dimension error, roughness and a transmittance in each portion of the object after Numerical Control processing is generated in the measurement.

7. The ultra-precise processing method for an inhomogeneous material according to claim 2, wherein the measurement performs surface measurement using a contact type probe having a low contact pressure, a laser or a non-contact type probe using atomic force, and optical measurement of a transmittance.

8. The ultra-precise processing method for an inhomogeneous material according to claim 1, wherein the Numerical Control processing includes cutting processing, grinding processing, or a composite process thereof.

9. The ultra-precise processing method for an inhomogeneous material according to claim 8, wherein the grinding processing uses electrolytic dressing using a metal bonded grinding stone.

10. An ultra-precise processing apparatus for an inhomogeneous material, comprising:
    a storage device which stores V-CAD data obtained by dividing external data consisting of boundary data of an object into rectangular parallelepiped cells having boundary planes orthogonal to each other in accordance with octree division and separating the respective divided cells into internal cells positioned on the inner side of the object and boundary cells including a boundary face, the storage device further storing a simulation program used to predict a processed surface shape after Numerical Control processing by simulation using the V-CAD data, and a data correction program used to correct the Numerical Control program;

a Numerical Control processing device which subjects the object to Numerical Control processing by a predetermined Numerical Control program; and a measurement device that measures a processed surface shape of the object on the Numerical Control processing device after Numerical Control processing, wherein processing correction data is obtained from a difference between the processed surface shapes acquired by simulation and measurement, and the Numerical Control program is corrected based on the processing correction data.

* * * * *